(12) United States Patent
Yang

(10) Patent No.: US 9,670,070 B2
(45) Date of Patent: Jun. 6, 2017

(54) COLLAPSIBLE WATER FILTER

(71) Applicant: Wender Yang, New Taipei (TW)

(72) Inventor: Wender Yang, New Taipei (TW)

(*) Notice: Subject to any disclaimer, the term of this patent is extended or adjusted under 35 U.S.C. 154(b) by 289 days.

(21) Appl. No.: 14/609,419

(22) Filed: Jan. 29, 2015

(65) Prior Publication Data

US 2016/0031719 A1 Feb. 4, 2016

(30) Foreign Application Priority Data

Jul. 30, 2014 (TW) .............................. 103125931 A

(51) Int. Cl.
- *B01D 35/22* (2006.01)
- *B01D 35/26* (2006.01)
- *B01D 25/00* (2006.01)
- *B01D 29/90* (2006.01)
- *C02F 1/00* (2006.01)

(52) U.S. Cl.
CPC ........ *C02F 1/002* (2013.01); *C02F 2201/006* (2013.01); *C02F 2201/009* (2013.01); *C02F 2307/02* (2013.01)

(58) Field of Classification Search
CPC ......... B01D 46/10; B01D 46/02; Y10S 65/31; G01N 1/38; G01N 2001/4088; C02F 1/002; C02F 2307/02; C02F 1/003; C02F 2307/04; C02F 2201/006
See application file for complete search history.

(56) References Cited

U.S. PATENT DOCUMENTS

| | | | | |
|---|---|---|---|---|
| 4,054,526 A * | 10/1977 | Muller | .................... | C02F 1/003 210/245 |
| 5,685,970 A * | 11/1997 | Ameen | ................ | C25D 7/0635 205/138 |
| 5,733,448 A * | 3/1998 | Kaura | ..................... | C02F 1/003 210/238 |
| 8,323,490 B1 * | 12/2012 | Wright | .................... | C02F 1/002 210/232 |
| 2008/0087596 A1 * | 4/2008 | Bommi | ................... | C02F 1/002 210/232 |
| 2009/0008318 A1 * | 1/2009 | Anes | ......................... | C02F 9/00 210/262 |
| 2016/0031719 A1 * | 2/2016 | Yang | ....................... | C02F 1/002 210/416.3 |

* cited by examiner

*Primary Examiner* — Ana Fortuna
(74) *Attorney, Agent, or Firm* — Wang Law Firm, Inc.

(57) ABSTRACT

A collapsible water filter has a telescopic container and a filter cartridge. The telescopic container has a telescopic segment and a connection segment, and the telescopic segment having a first end and a second end opposite to the first end. The telescopic segment defines a holding space, and the holding space has a first opening adjacent to the first end of the telescopic segment. When the first end and the second end of the telescopic segment are under a force such that the first end and the second end approach each other, the volume of the holding space is reduced. When the first end and the second end of the telescopic segment are under a force such that the first end and the second end move away from each other, the volume of the holding space is increased.

13 Claims, 17 Drawing Sheets

COLLAPSIBLE WATER FILTER

RELATED APPLICATION

This application claims priority to a Taiwanese patent application number 103125931, filed on Jul. 30, 2014, the specific of which is incorporated herein by this reference.

FIELD OF THE INVENTION

The present invention relates to a water filter, and more particularly to a portable water filter.

DESCRIPTION OF THE RELATED ART

The drinking water quality is one of the details that most people pay high attention to in daily life in the modern society. Food, clothing, residence and travel are four necessary elements of human life, and food is the top priority for people. In early agricultural society, agricultural wastes were generally degraded naturally without causing environmental pollution. Since the industrial society begun, people haven't achieved comprehensive control of the waste processing despite of continuous innovation and advance of science and technology. The discharge of industrial wastewater and disposal of wastes have resulted in severe pollution, directly and indirectly, to water sources and water quality. As a part of the food chain, humans must be responsible for the serious consequences of the pollution.

As water pollution has become increasingly severe, water quality has attracted extremely high attention. Normally, people boil tap water before drinking it. However, boiling still cannot effectively remove harmful substances in water and cannot ensure the clean, hygienic and safe water. As a result, most people install filters at home to address drinking water issues. Filters commonly used in home kitchens perform filtration by means of water's natural gravity, leading to a relatively slow rate, and are rarely carried about for outside use. Therefore, the inventors conclude that if a novel water filter could be developed to increase the filtration rate and be convenient for users to carry about, then users would be able to drink filtered water even when going outside.

SUMMARY OF THE INVENTION

The object of the present invention is to provide a water filter capable of increasing the filtration rate.

The water filter according to the present invention comprises a telescopic container and a filter cartridge, the telescopic container comprising a telescopic segment and a connection segment, the telescopic segment having a first end and a second end opposite to the first end, the telescopic segment defining a holding space, and the holding space having a first opening adjacent to the first end of the telescopic segment. When the first end and the second end of the telescopic segment are under a force such that the first end and the second end approach each other, the volume of the holding space is reduced. When the first end and the second end of the telescopic segment are under a force such that the first end and the second end move away from each other, the volume of the holding space is increased. The connection segment is connected to the first end of the telescopic segment, the filter cartridge is connected to the connection segment of the telescopic container, and comprises a water outlet hole and a water inlet hole open to a first opening of the holding space.

The present invention has the following advantageous effects: the telescopic segment of the telescopic container can be subjected to a force such that the volume of the holding space varies, the filter cartridge is connected to the telescopic container and its water inlet hole is open to the first opening of the holding space such that water to be filtered in the holding space can flow toward the filter cartridge when the volume of the holding space is reduced and pass through the filter cartridge to become filtered water. Since a user can exert a force on the telescopic container to increase the flow rate of water to be filtered through the filter cartridge, the water filter according to the present invention effectively increases the filtration rate.

DETAILED DESCRIPTION OF THE PREFERRED EMBODIMENT

The present invention will be described in detail below with reference to the accompanying drawings and embodiments.

Figure 1:
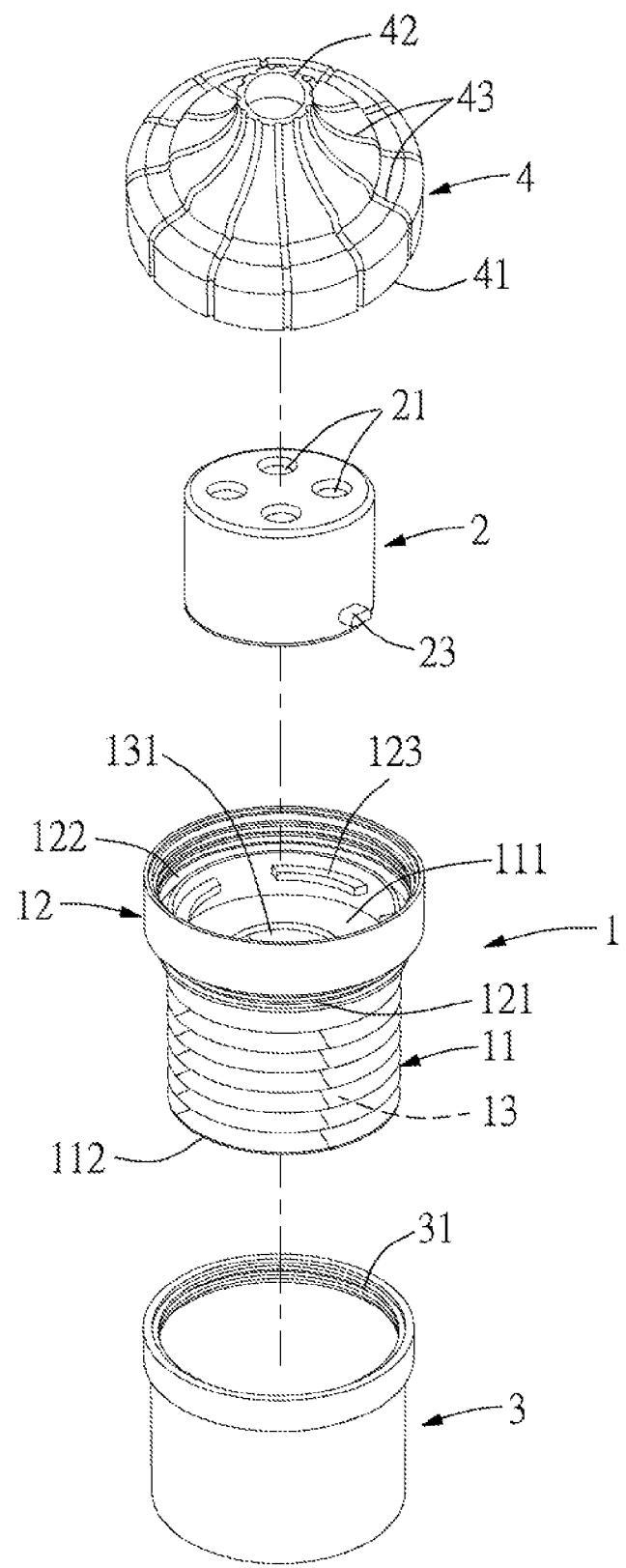
FIG. 1 is a 3-D exploded view to illustrate a first embodiment of the water filter according to the present invention.
Figure 2:
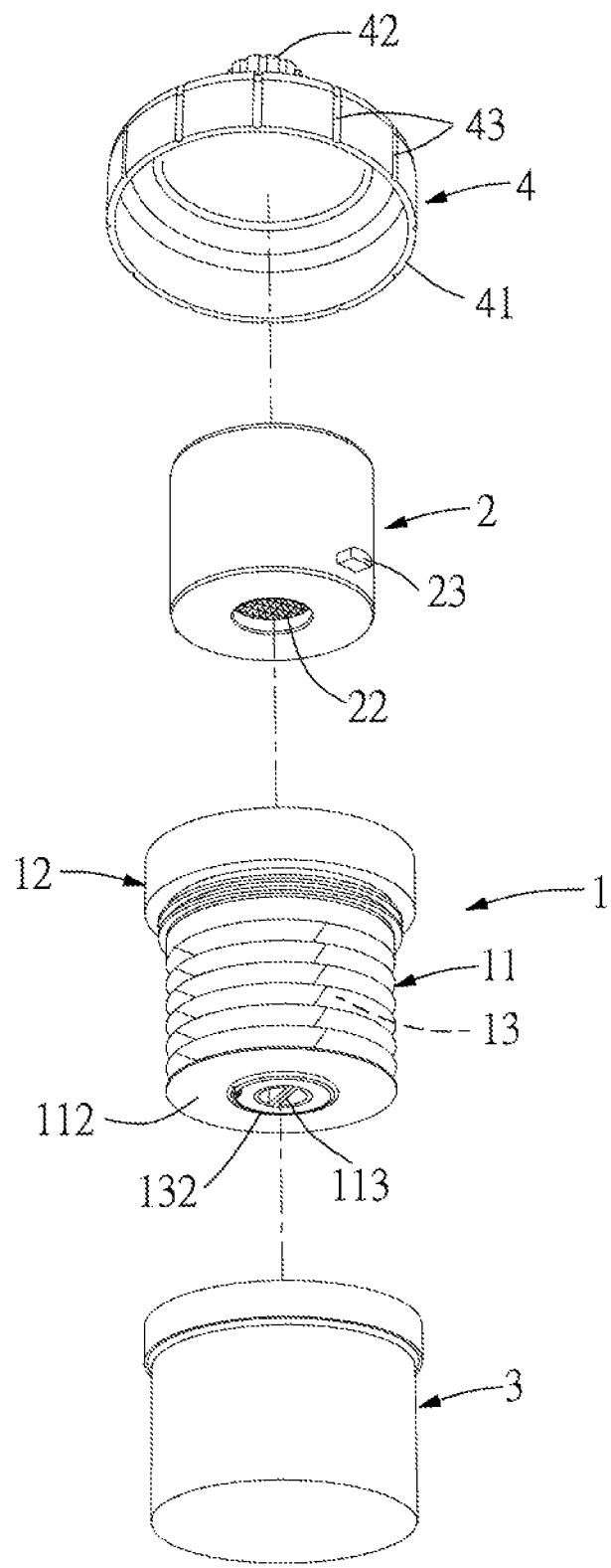
FIG. 2 is a 3-D exploded view from a different angle to illustrate the first embodiment of the water filter according to the present invention.
Figure 3:
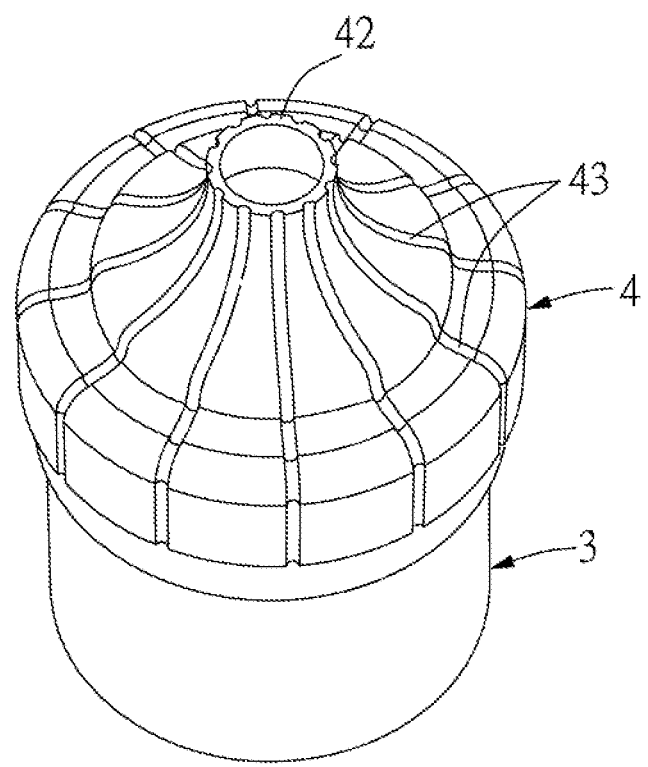
FIG. 3 is a 3-D assembled view to illustrate the first embodiment of the water filter according to the present invention.

Referring to FIGS. 1, 2 and 3, a first embodiment of the water filter according to the present invention comprises a telescopic container 1, a filter cartridge 2, a sleeve 3 and a funnel 4.

The telescopic container 1 comprises a collapsible telescopic segment 11 and a connection segment 12. The telescopic segment 11 has a first end 111, a second end 112 opposite to the first end 111, and a cap body 113. The telescopic segment 11 defines a holding space 13, and the holding space 13 has a first opening 131 adjacent to the first end 111 of the telescopic segment 11 and a second opening 132 adjacent to the second end 112 of the telescopic segment 11. The cap body 113 is used to seal the second opening 132. The volume of the holding space 13 may be adjusted between a maximum volume and a minimum volume. When the first end 111 and the second end 112 of the telescopic segment 11 are under a force such that the first end 111 and the second end 112 approach each other (collapses toward each other), the volume of the holding space 13 is reduced. When the first end 111 and the second end 112 of the telescopic segment 11 are under a force such that the first end 111 and the second end 112 move away from each other, the volume of the holding space 13 is increased. The telescopic segment 11 has a concertina structure, but is not limited thereby.

The connection segment 12 is of a ring shape and connected to the first end 111 of the telescopic segment 11, and comprises an external connection part 121, an internal connection part 122, and a plurality of locking grooves 123. The external connection part 121 and the internal connection part 122 have a threaded structure in this embodiment.

The filter cartridge 2 has a plurality of water outlet holes 21, one water inlet hole 22 and a plurality of locking projects 23 (only one shown) for engaging with the locking grooves 123. The filter cartridge 2 is connected to the connection segment 12 of the telescopic container 1 by locking the locking projects 23 into the locking grooves 123, and when the filter cartridge 2 is connected to the connection segment 12, the water inlet hole 22 of the filter cartridge 2 is open to the first opening 131 of the holding space 13.

The sleeve 3 is used to fit over the telescopic segment 11. The sleeve 3 comprises a connection part 31, and the connection part 31 in this embodiment has a threaded structure, which can connect with the external connection part 121 of the connection segment 12. When the connection part 31 of the sleeve 3 is connected with the external connection part 121 of the connection segment 12, the volume of the holding space 13 is reduced to the minimum volume.

The funnel 4 is used to fit over the connection segment 12 and receives the filter cartridge 2. The funnel 4 comprises a liquid collection end 41, a liquid discharge end 42 opposite to the liquid collection end 41 and a plurality of air exhaust grooves 43 formed by recessed external surface of the funnel 4 and extending between the liquid collection end 41 and the liquid discharge end 42.

Figure 4:
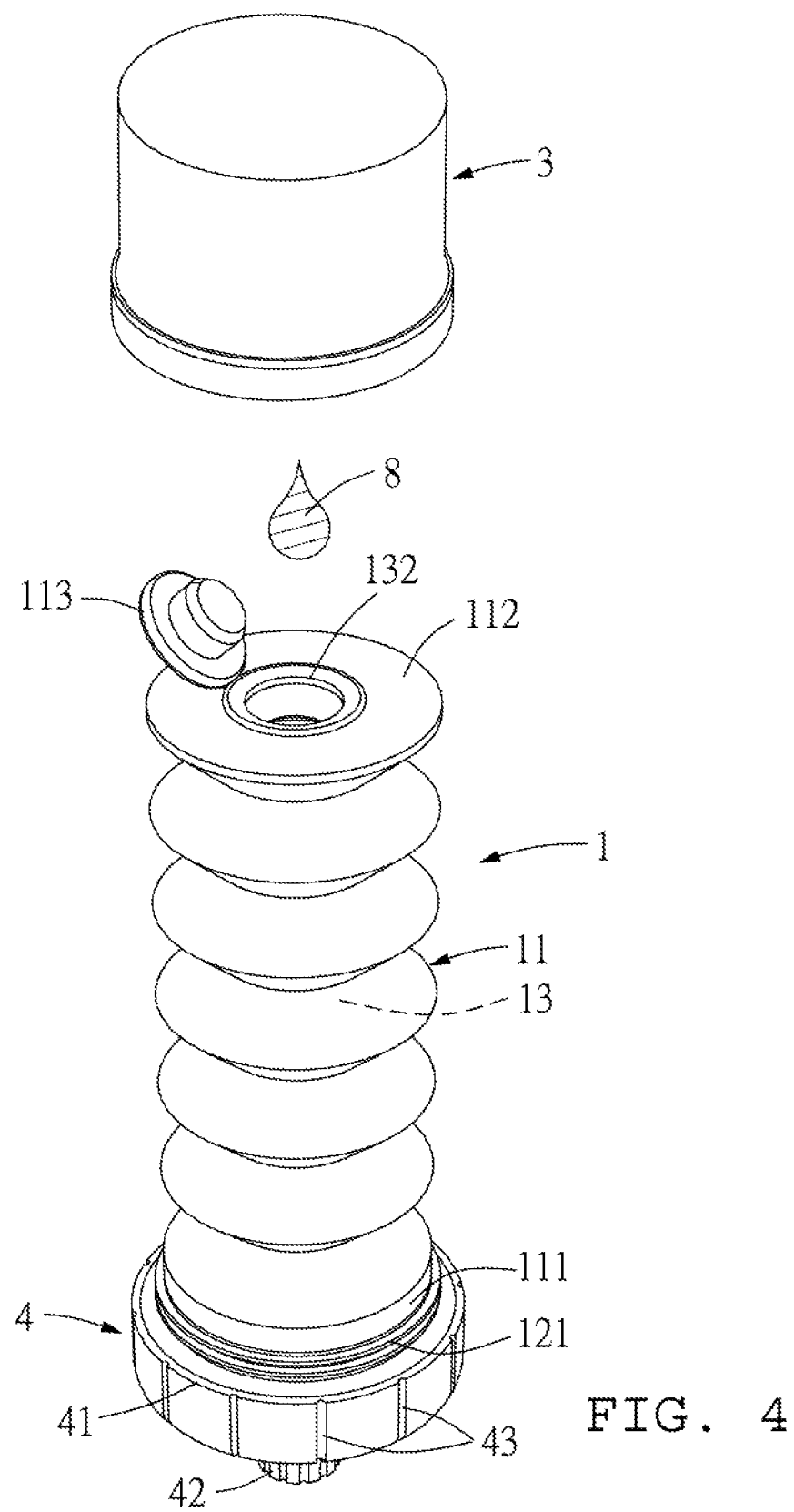
FIG. 4 is a 3-D view to illustrate a way to use the first embodiment of the water filter according to the present invention.
Figure 5:
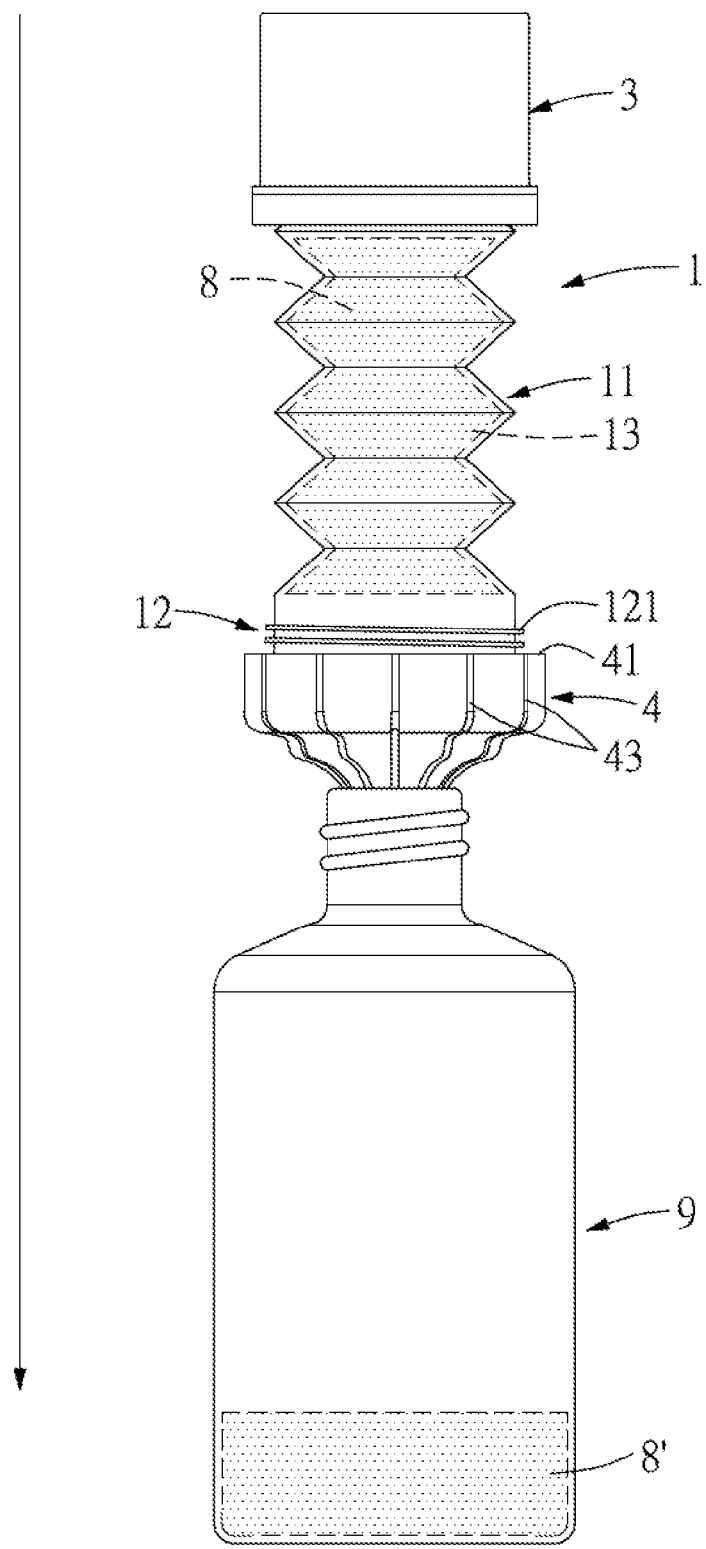
FIG. 5 is a side view to illustrate a way to use the first embodiment of the water filter according to the present invention.
Figure 6:
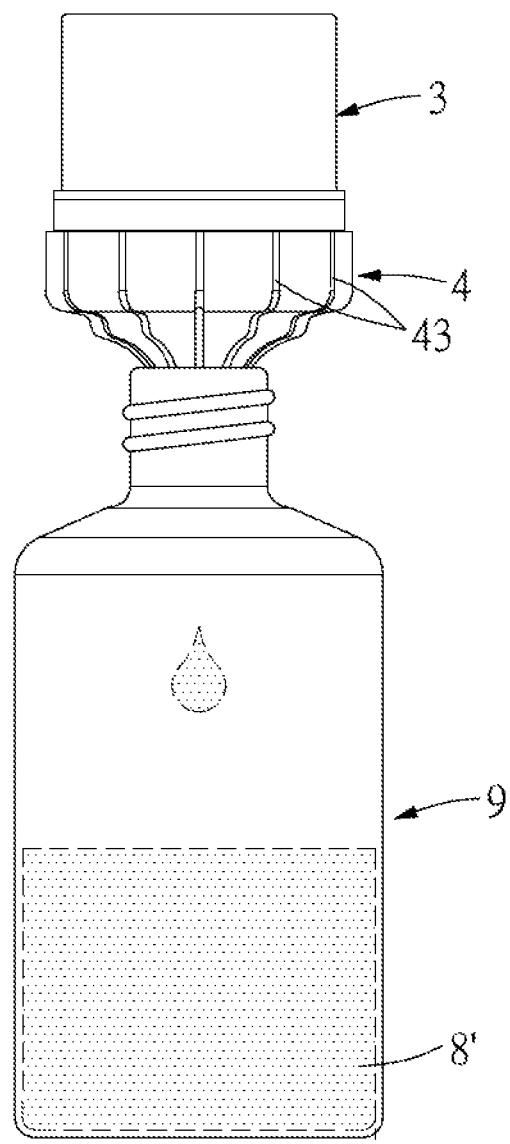
FIG. 6 is another side view to illustrate a way to use the first embodiment of the water filter according to the present invention.

Referring to FIG. 4, when the water filter according to the present invention is used, first connect the telescopic container 1 to the filter cartridge 2, fit the end of the funnel 4 that is adjacent to the liquid collection end 41 over the connection segment 12, stretch (expand) the telescopic segment 11 of the concertina structure such that the holding space 13 reaches the maximum volume, pour water 8 to be filtered into the holding space 13 through the second opening 132, and when the water pouring is completed, seal the second opening 132 with the cap body 113. Referring to FIG. 5, subsequently, fit the sleeve 3 over the second end of the telescopic segment 11, and place the liquid discharge end of the funnel 4 into a container 9. Subsequently, apply a force on the sleeve 3 in the arrow direction shown in FIG. 5 to press down, which will cause the telescopic segment 11 to collapse. Referring to FIG. 6, the second end 112 of the telescopic segment 11 of the telescopic container 1 is pressed by the sleeve 3 and approaches the first end 111, which in turn reduces the holding space 13 and makes the water 8 in the holding space 13 to enter the filter cartridge 2 via the first opening 131 (shown in FIG. 1) and the water inlet holes 22, and enter the container 9 via the water outlet holes 21 of the filter cartridge 2, thereby converted to a filtered water 8'. When the water 8 enters the container 9, the air inside the container 9 may be discharged via the air exhaust grooves 43 to outside of the container 9. As shown in FIG. 6, a user may continuously press down the sleeve 3 and connect the connection part 31 of the sleeve 3 with the external connection part 121 of the connection segment 12, thereby enabling most of the water 8 to be filtered to be converted to the filtered water 8'. Since the water filtration process in this embodiment makes 8 to be filtered to rapidly pass through the filter cartridge 2 by applying a force from a user, the filtration rate can be effectively increased.

Figure 7:
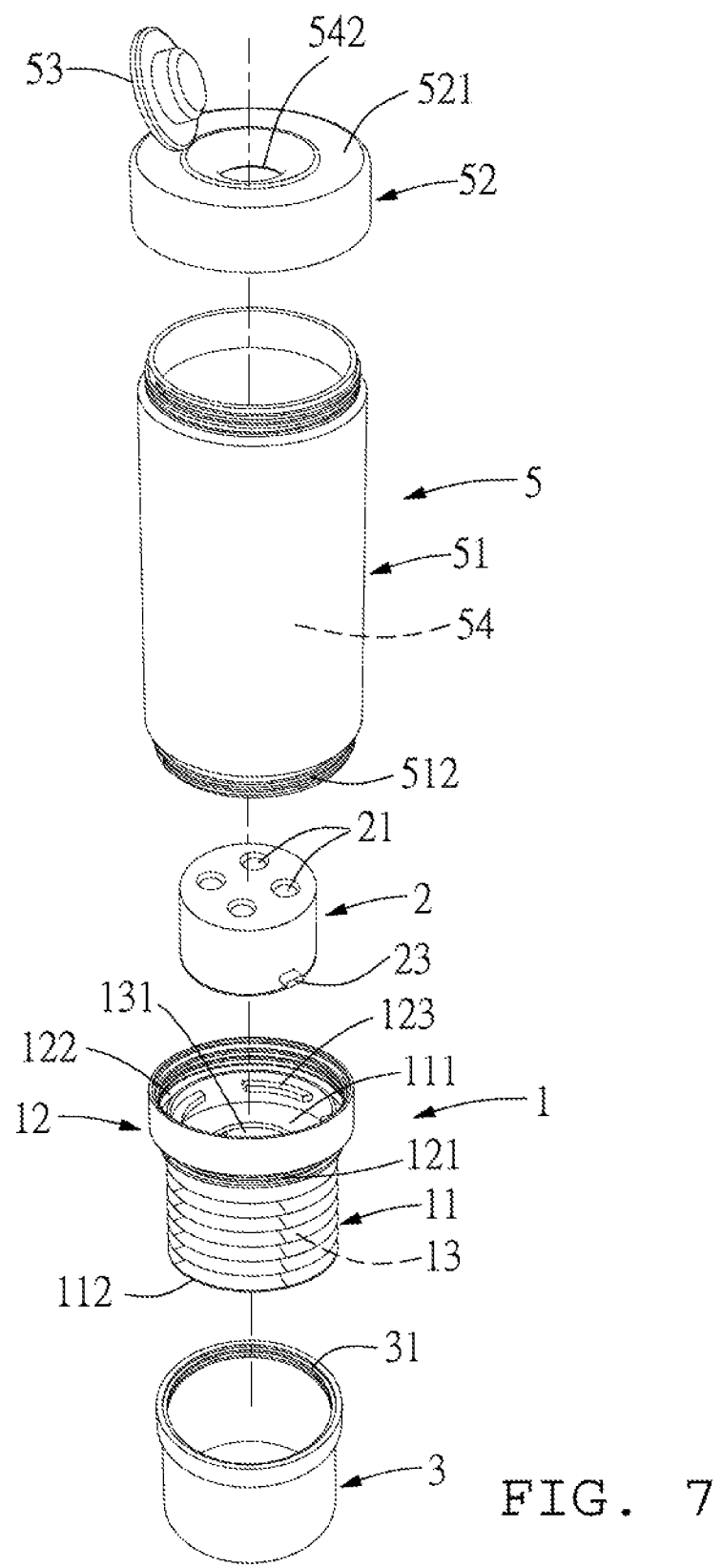
FIG. 7 is a 3-D exploded view to illustrate a second embodiment of the water filter according to the present invention.
Figure 8:
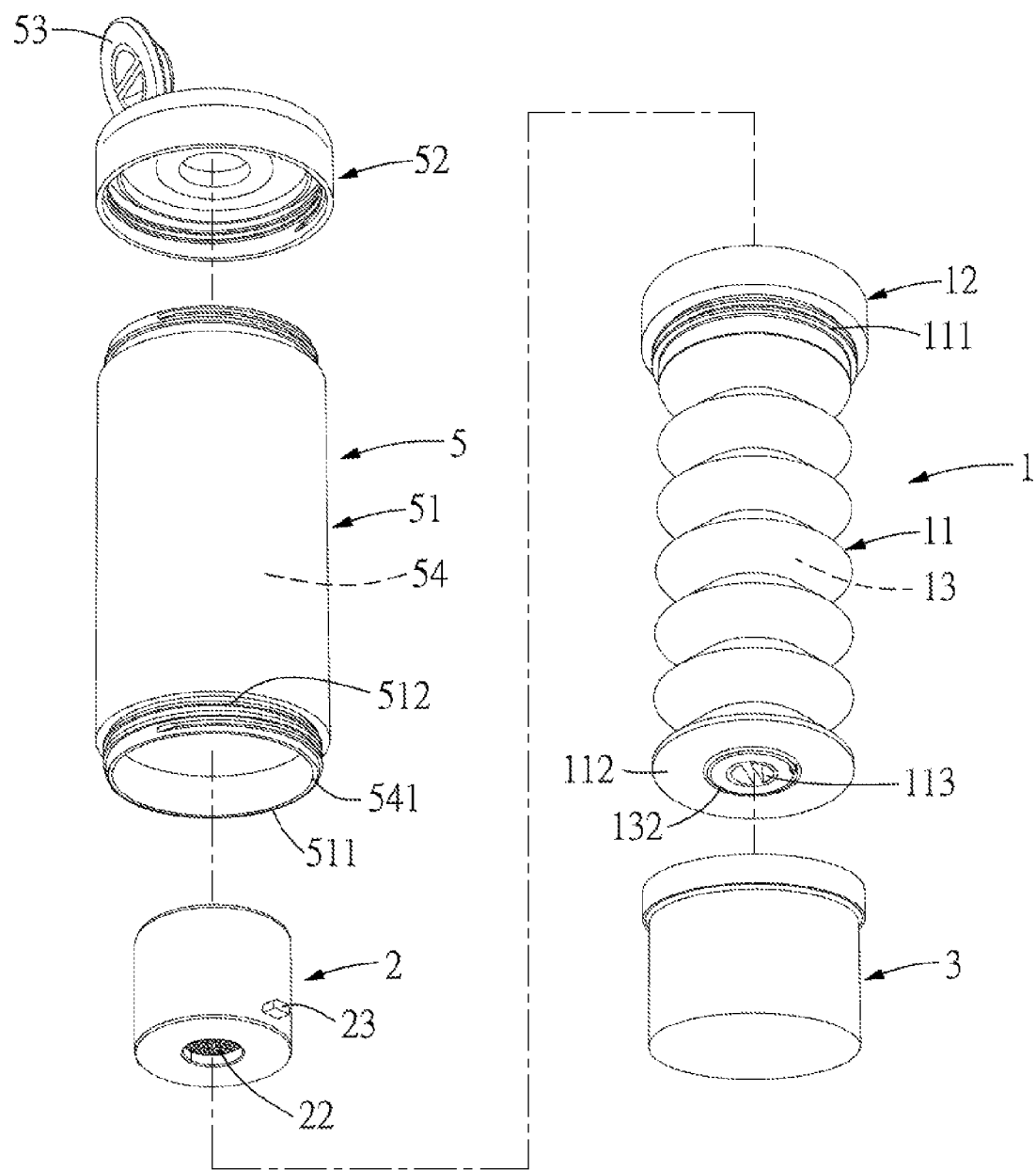
FIG. 8 is a 3-D exploded view from a different angle to illustrate the second embodiment of the water filter according to the present invention.
Figure 9:
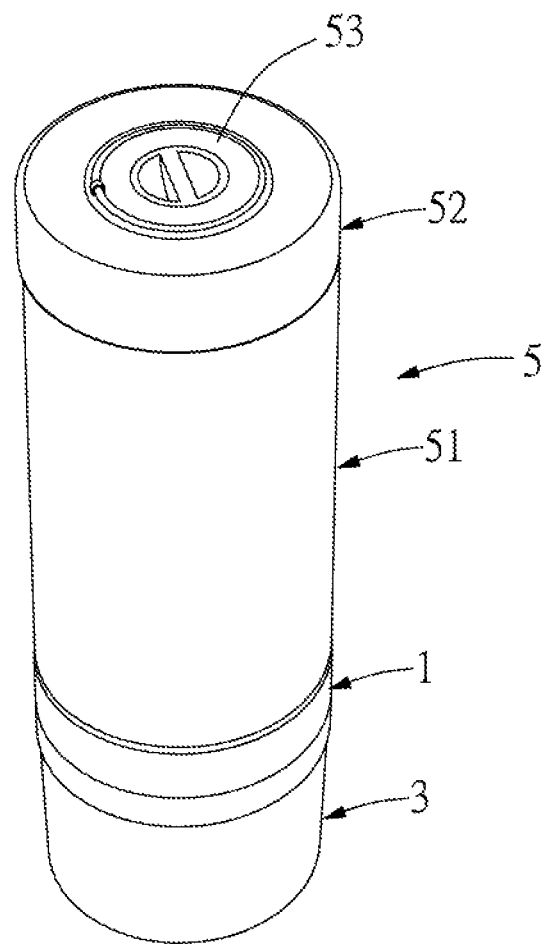
FIG. 9 is a 3-D assembled view to illustrate the second embodiment of the water filter according to the present invention.

Referring to FIGS. 7, 8 and 9, a second embodiment of the water filter according to the present invention comprises a telescopic container 1, a filter cartridge 2, a sleeve 3 and a liquid collection bottle 5. The telescopic container 1, filter cartridge 2, and sleeve 3 of this embodiment are the same as those in the first embodiment, and therefore will not be repeated herein.

The liquid collection bottle 5 comprises a bottle body 51, a first cap body 52 and a second cap body 53. The bottle body 51 has a connection end 511 and a connection part 512 adjacent to the connection end 511. The connection part 512 in this embodiment has a threaded structure, which can connect with the internal connection part 122 of the connection segment 12. The first cap body 52 comprises an air exhaust end 521. The bottle body 51 is connected with the first cap body 52 via the threaded structure, which jointly define a liquid collection space 54. The liquid collection space 54 comprises a third opening 541 adjacent to the connection end 511 and a fourth opening 542 adjacent to the air exhaust end 521. When the internal connection part 122 of the connection segment 12 is connected to the connection part 512 of the liquid collection bottle 5, the third opening 541 of the liquid collection space 54 is open to the water outlet holes 21 of the filter cartridge 2. The second cap body 53 is used to seal the fourth opening 542 of the liquid collection space 54.

Figure 10:
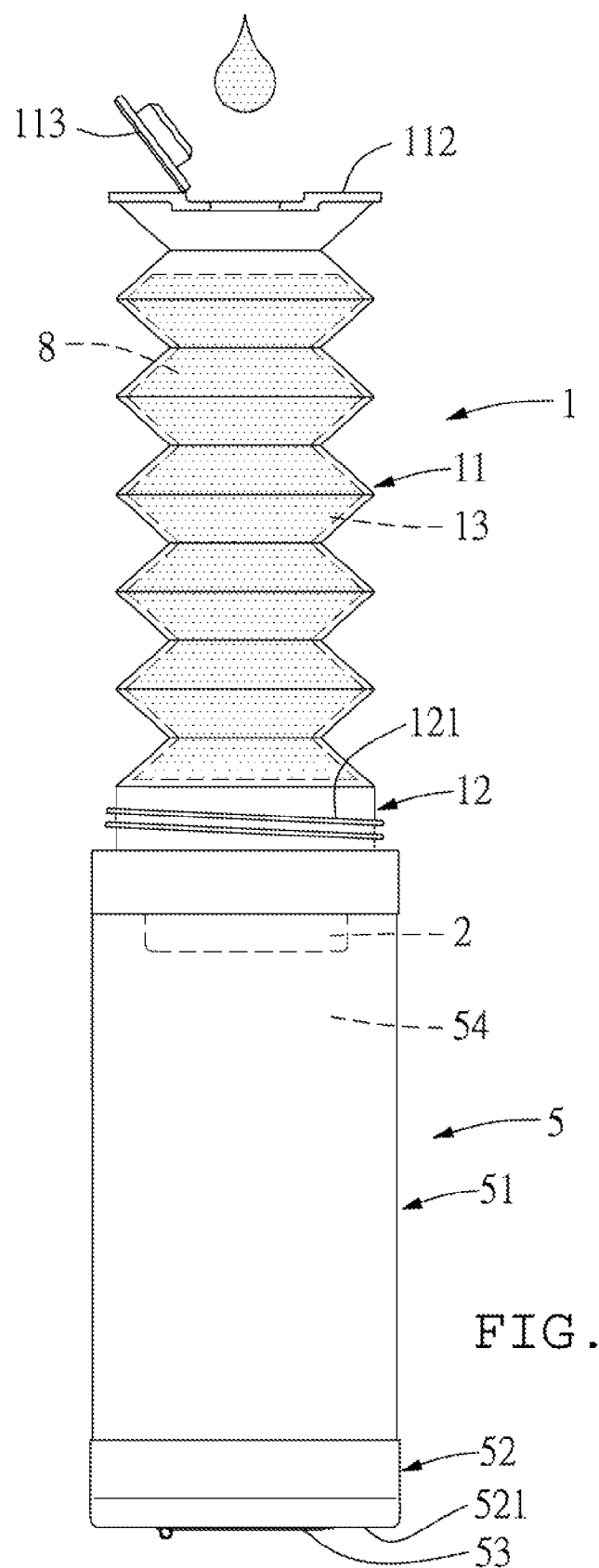
FIG. 10 is a side view to illustrate a way to use the second embodiment of the water filter according to the present invention.
Figure 11:
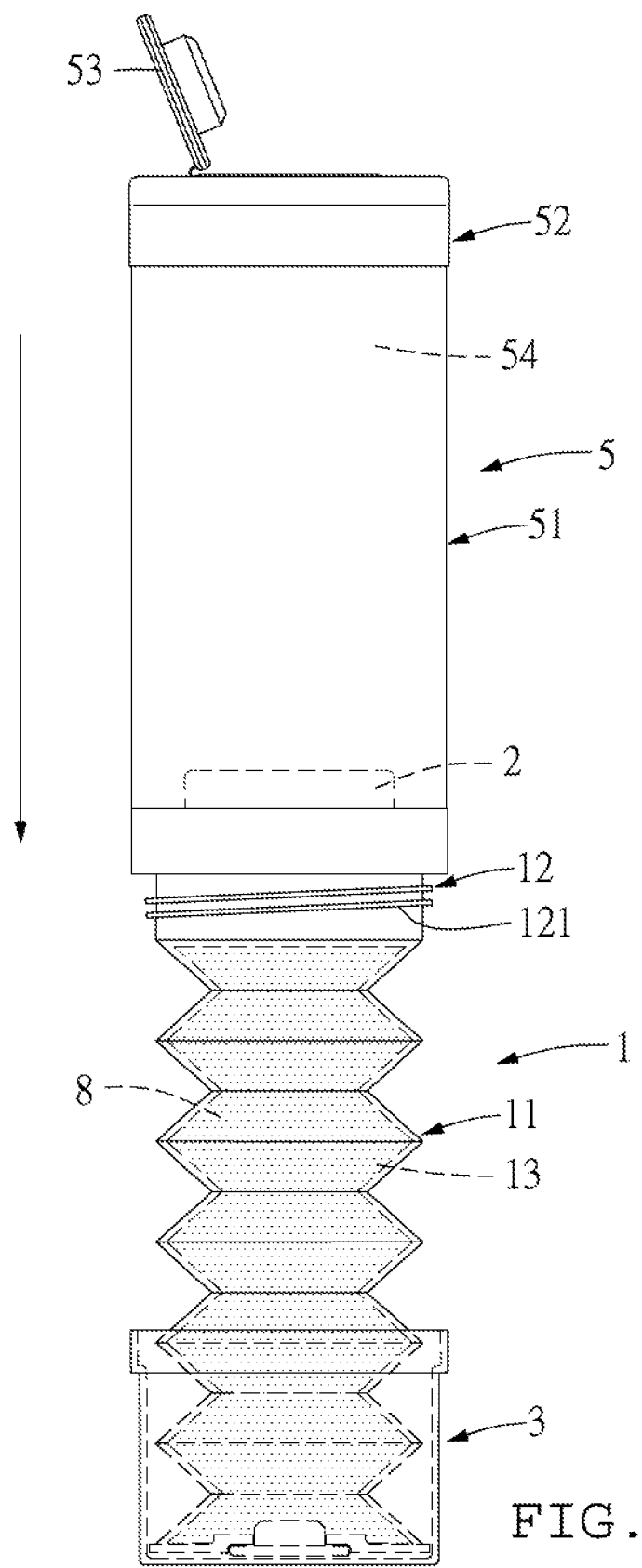
FIG. 11 is another side view to illustrate a way to use the second embodiment of the water filter according to the present invention.
Figure 12:
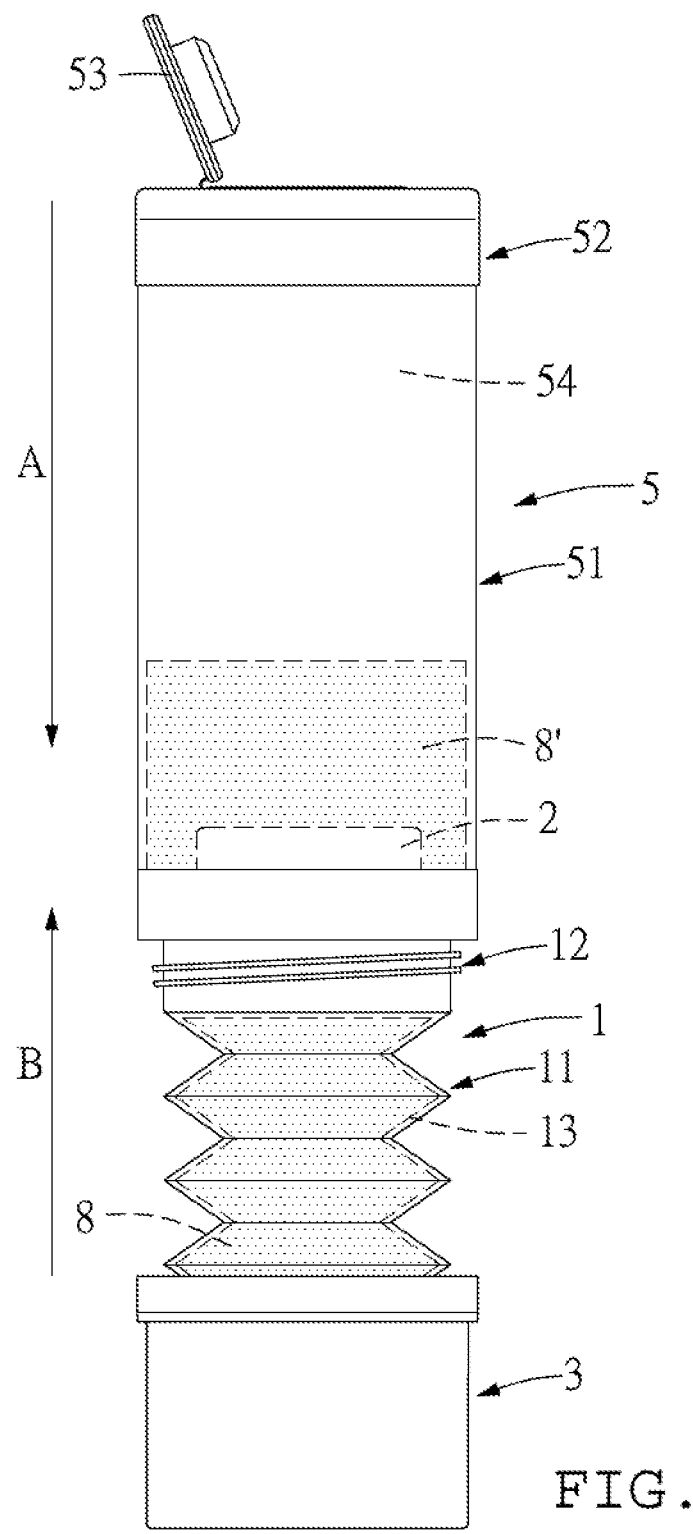
FIG. 12 is another side view to illustrate a way to use the second embodiment of the water filter according to the present invention.
Figure 13:
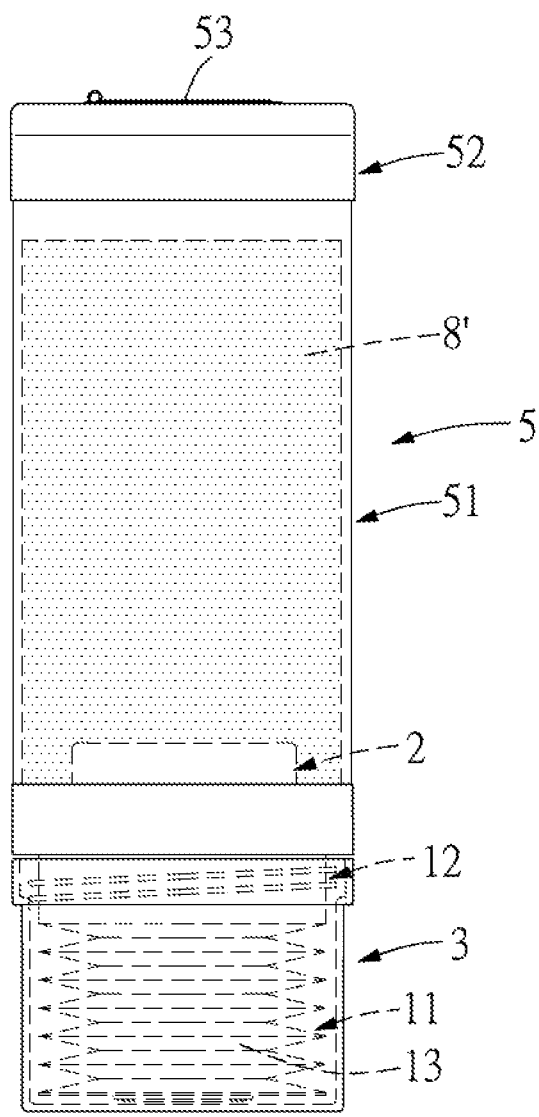
FIG. 13 is another side view to illustrate a way to use the second embodiment of the water filter according to the present invention.

Referring to FIG. 10, when the water filter according to the present invention is used, first connect the telescopic container 1 to the filter cartridge 2, connect the connection part 512 of the liquid collection bottle 5 to the internal connection part 122 of the connection segment 12, such that the liquid collection bottle 5 is connected to the telescopic container 1, stretch the telescopic segment 11 of the concertina structure such that the holding space 13 reaches the maximum volume, pour water 8 to be filtered into the holding space 13 through the second opening 132, and when the water pouring is completed, seal the second opening 132 with the cap body 113. Referring to FIG. 11, subsequently, keep the connected telescopic container 1, filter cartridge 2, and liquid collection bottle 5 upright and turn it over such that the liquid collection bottle 5 is above the telescopic container 1, fit the sleeve 3 over the second end of the telescopic segment 11, and open the second cap body 53 such that the fourth opening 542 of the liquid collection space 54 (see FIG. 7) is the open state. Subsequently, apply a force on the liquid collection bottle 5 in the arrow direction shown in FIG. 11 to press down. Referring to FIG. 12, when the liquid collection bottle 5 is pressed and moves downwardly along the direction of arrow A, the first end 111 of the telescopic segment 11 of the telescopic container 1 is pressed by the liquid collection bottle 5 and approaches the second end 112, which in turn reduces the holding space 13 and makes the water 8 in the holding space 13 to enter the filter cartridge 2 via the first opening 131 (shown in FIG. 7) and the water inlet holes 22 along the direction of arrow B, and enter the liquid collection space 54 of the liquid collection bottle 5 via the water outlet holes 21 of the filter cartridge 2, thereby converted to a filtered water 8. When the water 8 enters the liquid collection space 54 of the liquid collection bottle 5, the air inside the liquid collection space 54 of the liquid collection bottle 5 may be discharged via the fourth opening 542 opened by the second cap body 53 to outside of the liquid collection bottle 5. Referring to FIG. 13, which shows the telescopic segment 11 in a collapsed position, a user may continuously press down the liquid collection bottle 5 and connect the connection part 31 of the sleeve 3 with the external connection part 121 of the connection segment 12, thereby enabling most of the water 8 to be filtered to be converted to the filtered water 8. Since the water filtration process in this embodiment makes 8 to be filtered to rapidly pass through the filter cartridge 2 by applying a force from a user, just like the first embodiment, the filtration rate can be effectively increased.

Figure 14:
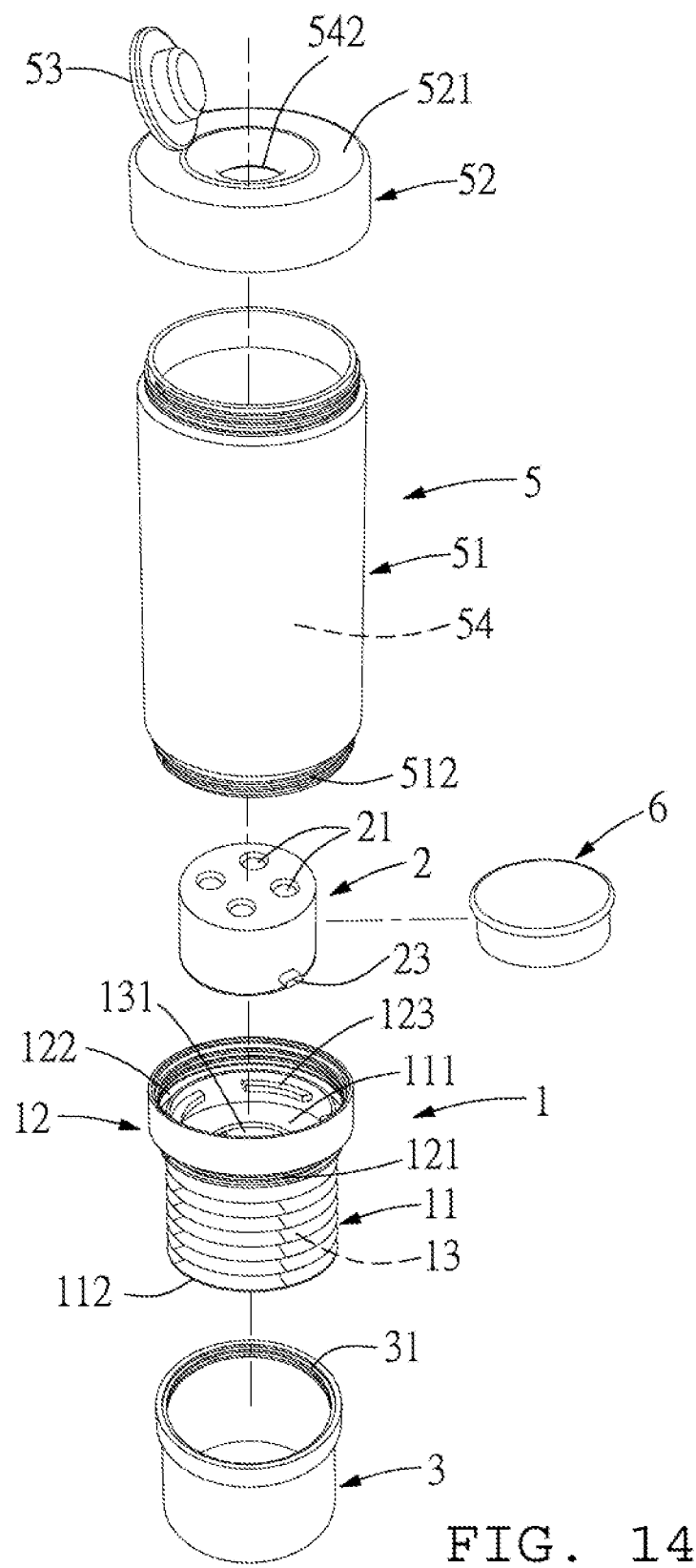
FIG. 14 is a 3-D exploded view to illustrate a third embodiment of the water filter according to the present invention.
Figure 15:
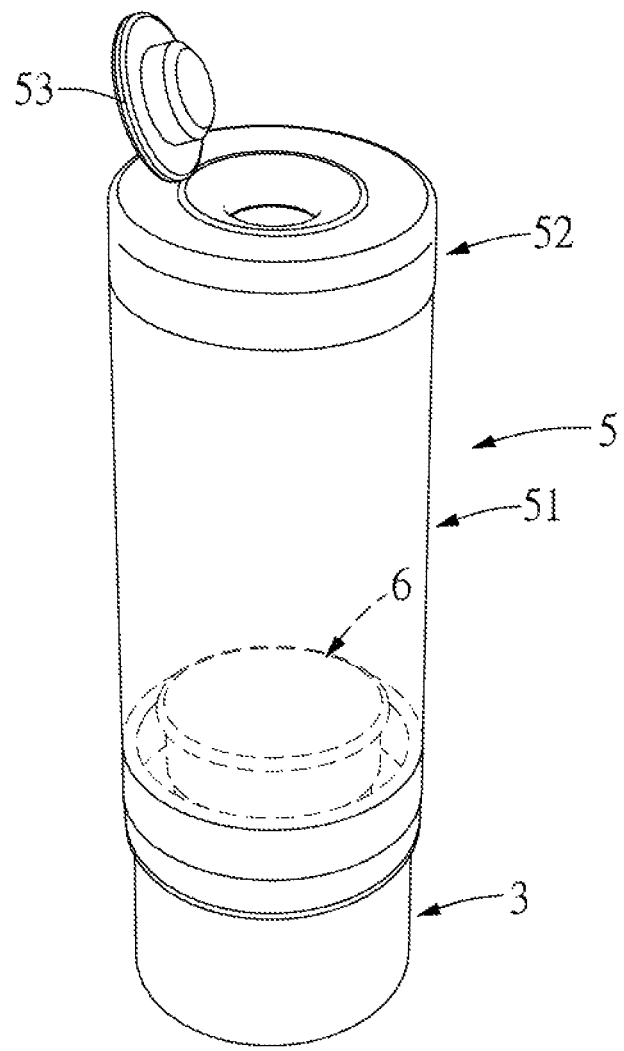
FIG. 15 is a 3-D assembled view to illustrate the third embodiment of the water filter according to the present invention.

Referring to FIGS. 14 and 15, a third embodiment of the water filter according to the present invention is similar to the second embodiment except that the third embodiment comprises a sealing cap 6. The sealing cap 6 can cover the filter cartridge 2 and seal the water outlet holes 21, thereby isolating the filter cartridge 2 from the liquid collection space 54.

Figure 16:
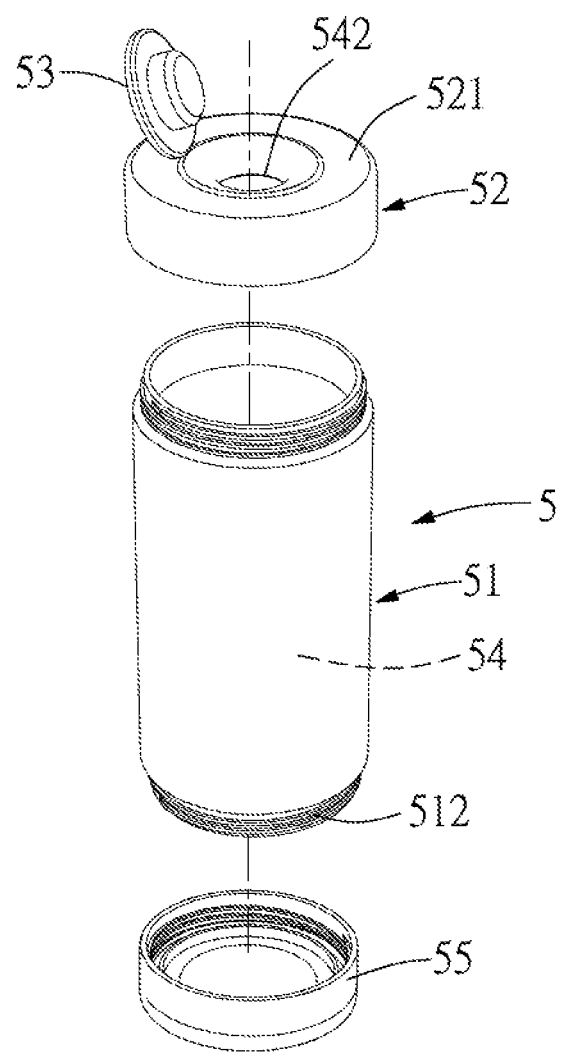
FIG. 16 is a 3-D exploded view to illustrate that a liquid collection bottle in the second embodiment of the water filter according to the present invention may be combined with a third cap body to form a container for independent use.
Figure 17:
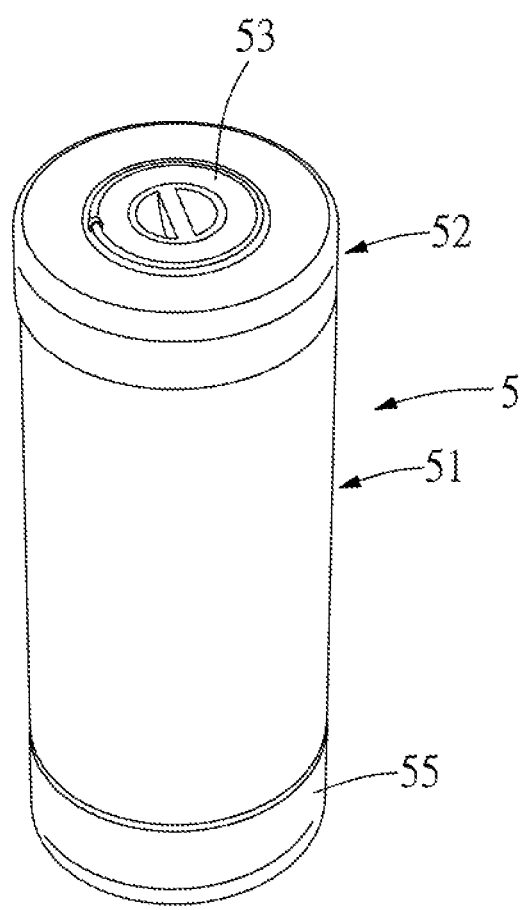
FIG. 17 is a 3-D assembled view to illustrate that a liquid collection bottle in the second embodiment of the water filter according to the present invention may be combined with the third cap body to form a container for independent use.

Referring to FIGS. 16 and 17, it is additionally noted that the liquid collection bottle 5 can be further connected to a third cap body 55 to become a container without the filtration capacity.

In summary, with the water filter according to the present invention, the telescopic segment 11 of the concertina structure of the telescopic container 1 can be subjected to a force such that the volume of the holding space 13 varies, the filter cartridge 2 is connected to the telescopic container 1 and its water inlet hole 22 is open to the first opening 131 of the holding space 13 such that water 8 to be filtered in the holding space 13 can flow toward the filter cartridge 2 when the volume of the holding space 13 is reduced and pass through the filter cartridge 2 to become filtered water 8. Since a user can exert a force on the telescopic container 1 to increase the flow rate of water 8 to be filtered through the filter cartridge 2, the water filter according to the present invention effectively increases the filtration rate, and can indeed achieve the goal of the present invention.

The invention claimed is:

1. A water filter comprising:
   a telescopic container comprises
   a telescopic segment with a first end and a second end, the telescopic segment defining a holding space with a first opening adjacent to the first end, and
   a connection segment attached to the first end of the telescopic segment;
   a filter cartridge, with a water outlet hole and a water inlet hole, connected to the connection segment of the telescopic container; and
   a funnel connected to the connection segment and covering the filter cartridge,
   wherein, when the telescopic container is in an expanded position, the first end and the second move away each other and a volume of the holding space is increased,
   a sleeve at an opposite position with respect to funnel, and exerting pressure in the telescopic container
   when the telescopic container is in a collapse position, the first end and the second move toward each other and the volume of the holding space is reduced and a liquid inside the holding space is forced out through the water outlet hold of the filter cartridge.

2. The water filter according to claim 1, characterized in that the telescopic segment has a concertina structure.

3. The water filter according to claim 1, characterized in that the holding space has a second opening adjacent to the second end of the telescopic segment, the telescopic segment comprising a cap body for sealing the second opening.

4. The water filter according to claim 1, characterized in that the volume of the holding space may be adjusted between a maximum volume and a minimum volume, the water filter further comprises a sleeve, the sleeve is used to fit over the telescopic segment, the sleeve comprises a connection part, the connection segment has an external connection part capable of connecting to the connection part of the sleeve, and when the connection part of the sleeve is connected with the external connection part of the connection segment, the volume of the holding space is reduced to the minimum volume.

5. The water filter according to claim 1, wherein the funnel has a liquid discharge end and a plurality of the air exhaust grooves distributed radially around the liquid discharge end, each of the plurality of air exhaust grooves is formed by a recessed external surface of the funnel.

6. The water filter according to claim 1, characterized in that the water filter further comprises a liquid collection bottle, the liquid collection bottle defines a liquid collection space and comprises a connection end, an air exhaust end and a connection part adjacent to the connection end, the liquid collection space comprises a third opening adjacent to the connection end and a fourth opening adjacent to the air exhaust end, the connection segment of the telescopic container has an internal connection part capable of connecting with the connection part of the liquid collection bottle, and when the internal connection part of the connection segment is connected to the connection part of the liquid collection bottle, the third opening of the liquid collection space is open to the water outlet holes of the filter cartridge.

7. The water filter according to claim 6, characterized in that the liquid collection bottle comprises a bottle body and a first cap body that define a liquid collection space, and a second cap body, the bottle body has the connection end and the connection part, the first cap body comprises the air exhaust end, and the second cap body is used to seal the fourth opening of the liquid collection space.

8. The water filter according to claim 1, characterized in that the water filter further comprises a sealing cap, the sealing cap capable of covering the filter cartridge and sealing the water outlet holes.

9. The water filtering device of claim 1, wherein the funnel has an external surface with a plurality of air exhaust grooves distributed radially around the liquid discharge end and each of the plurality of air exhaust grooves is formed by a recessed external surface of the funnel.

10. The water filtering device of claim 1, wherein the filter cartridge further comprises a plurality of locking projects and the connection segment further comprises a plurality of locking grooves for engaging the plurality of locking projects.

11. The water filtering device of claim 1, wherein the telescopic segment further a second opening.

12. The water filtering device of claim 1, further comprising a cap body for covering the second opening.

13. A water filtering device comprising:
- a sleeve;
- an telescopic segment, when in a collapse position, fitting inside the sleeve;
- a connection segment attached to the telescopic segment, the connection segment having external threads for connecting to the sleeve;
- a filter cartridge removably attached to the connection segment, the filter cartridge having at least one liquid inlet hole and at least one liquid outlet hole, the at least one liquid inlet hole facing the telescopic segment; and
- a funnel with a liquid discharge end connected to the connection segment and covering the filter cartridge.

\* \* \* \* \*